United States Patent
Mastro

(10) Patent No.: US 10,630,846 B2
(45) Date of Patent: Apr. 21, 2020

(54) INTERCOMMUNICATION SYSTEM WITH ADAPTIVE TRANSMIT DELAY

(71) Applicant: QRT Software, LLC, Raleigh, NC (US)

(72) Inventor: Kenneth Alan Mastro, Cary, NC (US)

(73) Assignee: QRT Software, LLC, Raleigh, NC (US)

( * ) Notice: Subject to any disclaimer, the term of this patent is extended or adjusted under 35 U.S.C. 154(b) by 0 days.

(21) Appl. No.: 16/381,807

(22) Filed: Apr. 11, 2019

(65) Prior Publication Data

US 2019/0320071 A1    Oct. 17, 2019

Related U.S. Application Data

(60) Provisional application No. 62/658,036, filed on Apr. 16, 2018.

(51) Int. Cl.
*H04M 9/08* (2006.01)
*H04R 3/02* (2006.01)

(52) U.S. Cl.
CPC ........... *H04M 9/085* (2013.01); *H04M 9/082* (2013.01); *H04R 3/02* (2013.01)

(58) Field of Classification Search
CPC .......... G01S 13/08; G06Q 20/32; H04B 1/46; H04M 9/08; H04M 9/085; H04M 11/00; H04R 3/02; H04W 4/10; H04W 76/00; H04W 4/00; H04W 48/04; H04W 72/00; G06F 15/16; G06F 15/173; H04L 29/06
USPC .......... 367/95; 370/289, 315, 327, 328, 335, 370/336, 352, 286; 375/295; 379/202.01, 406.06, 406.11; 455/412.2, 455/416, 420, 422.1, 436, 456.1, 516, 455/517, 518, 550.1, 560, 406, 456.4; 714/746; 381/94.1; 704/226, 233
See application file for complete search history.

(56) References Cited

U.S. PATENT DOCUMENTS

| | | | | |
|---|---|---|---|---|
| 4,821,310 A * | 4/1989 | Lynk, Jr. | ............... | H04W 76/10 455/517 |
| 5,699,354 A * | 12/1997 | Gulliford | ............... | H04W 84/08 370/315 |
| 6,021,326 A * | 2/2000 | Nguyen | ................. | H04Q 3/002 455/422.1 |
| 6,529,486 B1 * | 3/2003 | Barnes | ................. | H04W 84/08 370/327 |

(Continued)

OTHER PUBLICATIONS

JPS Interoperability Solutions, Inc., ACU-2000 IP-Centric Interoperability Gateway, JPS Interoperability Solutions, Mar. 10, 2018.

*Primary Examiner* — Gerald Gauthier
(74) *Attorney, Agent, or Firm* — NK Patent Law

(57) ABSTRACT

An intercommunication system with Adaptive Transmit Delay patches audio sources to a radio system (e.g., a trunked-radio system) such that outgoing audio is sent to the radio system as soon as a channel has been acquired, without further transmit delay. The intercommunication system generates a pattern representative of the radio's Talk Permit Tone. The intercommunication system then buffers outgoing audio while analyzing incoming audio from the radio and comparing the incoming audio to the generated pattern to determine when a Talk Permit Tone has been received. When the Talk Permit Tone is received, the intercommunication system releases buffered outgoing audio for transmission.

20 Claims, 7 Drawing Sheets

(56) References Cited

U.S. PATENT DOCUMENTS

| | | | | |
|---|---|---|---|---|
| 6,950,513 B2* | 9/2005 | Hirai | | H04M 9/082 |
| | | | | 379/406.01 |
| 7,099,291 B2* | 8/2006 | Harris | | H04W 4/10 |
| | | | | 370/335 |
| 7,260,414 B2* | 8/2007 | Hassan | | H04W 4/10 |
| | | | | 455/518 |
| 8,090,575 B2 | 1/2012 | Hall et al. | | |
| 8,150,450 B1* | 4/2012 | Wengrovitz | | H04L 65/403 |
| | | | | 455/416 |
| 8,199,927 B1* | 6/2012 | Raftery | | H04M 9/082 |
| | | | | 370/286 |
| 8,369,829 B2* | 2/2013 | Nagubhai | | H04W 4/24 |
| | | | | 455/406 |
| 8,478,261 B2* | 7/2013 | Vempati | | H04L 65/80 |
| | | | | 455/422.1 |
| 8,639,278 B1 | 1/2014 | Samios | | |
| 9,075,144 B1* | 7/2015 | Straub | | G01S 13/882 |
| 9,485,787 B2* | 11/2016 | Patel | | H04W 4/10 |
| 9,913,300 B2* | 3/2018 | Ayyasamy | | H04W 4/08 |
| 9,961,514 B2* | 5/2018 | Kundu | | H04W 4/08 |
| 10,057,105 B2* | 8/2018 | Patel | | G06F 16/27 |
| 10,064,021 B1* | 8/2018 | Aloni | | H04L 65/4061 |
| 10,110,342 B2* | 10/2018 | Negalaguli | | H04L 1/0026 |
| 10,111,055 B2* | 10/2018 | Patel | | H04W 4/10 |
| 10,129,307 B2* | 11/2018 | Negalaguli | | H04L 1/0014 |
| 10,178,513 B2* | 1/2019 | Negalaguli | | H04W 12/0017 |
| 10,341,823 B2* | 7/2019 | Vempati | | H04W 4/10 |
| 10,362,074 B2* | 7/2019 | Patel | | H04L 65/80 |
| 10,362,535 B2* | 7/2019 | Patel | | H04L 29/00 |
| 10,367,863 B2* | 7/2019 | Patel | | H04L 65/1006 |
| 10,555,370 B2* | 2/2020 | Ayyasamy | | H04L 65/4061 |
| 2002/0064139 A1* | 5/2002 | Bist | | H04B 3/23 |
| | | | | 370/289 |
| 2003/0224825 A1* | 12/2003 | Cox | | H04M 1/72505 |
| | | | | 455/560 |
| 2005/0180394 A1* | 8/2005 | Kautz | | H04L 12/5692 |
| | | | | 370/352 |
| 2006/0046697 A1* | 3/2006 | Koren | | H04W 4/10 |
| | | | | 455/412.2 |
| 2006/0046741 A1* | 3/2006 | Loesch | | H04L 29/12216 |
| | | | | 455/456.1 |
| 2006/0133325 A1* | 6/2006 | Harris | | H04W 72/04 |
| | | | | 370/336 |
| 2006/0172754 A1* | 8/2006 | Shin | | H04W 4/10 |
| | | | | 455/518 |
| 2007/0133442 A1* | 6/2007 | Masuda | | H04B 3/20 |
| | | | | 370/286 |
| 2008/0147392 A1* | 6/2008 | Shaffer | | G10L 21/0208 |
| | | | | 704/233 |
| 2008/0261576 A1* | 10/2008 | Wengrovitz | | H04L 12/1822 |
| | | | | 455/416 |
| 2010/0159975 A1* | 6/2010 | Shaffer | | H04W 76/32 |
| | | | | 455/516 |
| 2010/0313094 A1* | 12/2010 | Kubota | | H04L 27/3863 |
| | | | | 714/746 |
| 2012/0155566 A1* | 6/2012 | Khan | | H04B 7/155 |
| | | | | 375/295 |
| 2012/0230254 A1* | 9/2012 | Otamendi | | H04L 12/66 |
| | | | | 370/328 |
| 2014/0335902 A1* | 11/2014 | Guba | | H04W 4/48 |
| | | | | 455/456.4 |
| 2015/0081287 A1* | 3/2015 | Elfenbein | | G10L 21/0208 |
| | | | | 704/226 |
| 2015/0124950 A1* | 5/2015 | Koenig | | H04M 3/563 |
| | | | | 379/202.01 |
| 2016/0044394 A1* | 2/2016 | Derom | | H04R 1/00 |
| | | | | 367/95 |
| 2016/0050547 A1* | 2/2016 | Wong | | H04R 1/1041 |
| | | | | 455/518 |
| 2016/0080539 A1* | 3/2016 | Limbaugh | | G08C 17/02 |
| | | | | 455/420 |
| 2016/0150455 A1* | 5/2016 | Suryavanshi | | H04W 36/245 |
| | | | | 455/436 |
| 2016/0210613 A1* | 7/2016 | McGill | | G06Q 20/3278 |
| 2016/0227588 A1* | 8/2016 | Patel | | H04W 4/10 |
| 2016/0269877 A1* | 9/2016 | Tang | | H04W 4/10 |
| 2018/0070290 A1* | 3/2018 | Breaux | | H04W 76/14 |
| 2018/0070291 A1* | 3/2018 | Breaux | | H04W 4/33 |
| 2018/0294835 A1* | 10/2018 | Furuta | | H04B 1/46 |
| 2019/0320071 A1* | 10/2019 | Mastro | | H04R 3/02 |

* cited by examiner

INTERCOMMUNICATION SYSTEM WITH ADAPTIVE TRANSMIT DELAY

CROSS-REFERENCE TO RELATED APPLICATIONS

This application claims priority to U.S. Provisional Patent Application No. 62/658,036 filed on Apr. 16, 2018 entitled "INTERCOMMUNICATION SYSTEM WITH ADAPTIVE TRANSMIT DELAY," the entire contents of which is incorporated by reference herein.

TECHNICAL FIELD

The present invention relates to methods and devices for using a radio's Talk Permit Tone to provide an Adaptive Transmit Delay in audio-patching systems that connect multiple types of audio sources to a trunked-radio system.

BACKGROUND

Trunked-radio systems are well-known in the prior art. Trunked-radio systems are commonly used by a number of different organizations. Often, the organizations are public-safety organizations, such as police departments, fire departments, EMS, public works, etc.

In a trunked-radio system, when a user (e.g., a police officer) wants to transmit, the user presses a Push to Talk button on their radio (referred to as "keying the radio"). Once the user keys the radio, the radio communicates with a controller over a known control channel to acquire a frequency/channel to use for that desired transmission. This process of acquiring a channel is transparent from the user's perspective.

Once the radio has acquired a channel, the radio emits a Talk Permit Tone, which audibly indicates to the user that the radio has successfully acquired a channel and that the user may begin speaking.

Radios made by different radio manufacturers generally use different Talk Permit Tones. Therefore, radios of different organizations may emit different Talk Permit Tones. A problem arises when users of one trunked-radio system (e.g., police department) want or need to communicate with users of another trunked-radio system (e.g., fire department). Such communication across multiple organizations may be desirable in many different situations, such as in emergency scenarios where police, fire, and EMS need to be in real-time communication with one another. Similarly, there may be times when other types of communications systems need to be able to communicate with users on a trunked-radio system. For example, a user of a cellular phone may want to talk to a user of a trunked-radio system.

Radio systems exist in the prior art for patching trunked-radio systems to other audio sources, such as other trunked-radio systems or cellular systems. These systems are often referred to as intercommunication systems, connectivity systems, and/or interoperability systems. An intercommunication system generally connects to one radio from each trunked-radio system being patched, as well as any other audio sources being patched (such as a cellular telephone). To patch an audio source to a trunked-radio system, an intercommunication system generally keys the radio to which it is connected (i.e., requests a channel) as soon as the intercommunication system knows that it needs to send audio to the trunked-radio system.

A problem occurs when patching other audio sources to a trunked-radio system because the users of the other audio sources do not provide any advance notice that they are about to start talking; instead, they just start talking. This can be a problem because there is an initial delay in trunked-radio systems while the transmitting radio acquires a channel. In other words, the transmitting user in one system begins speaking before the radio in the trunked-radio system to which that user is being patched has acquired a channel. As a result, the intercommunication system must acquire a channel on the trunked-radio system "on demand," or in real-time.

Acquiring a channel in real-time can be problematic because (1) a channel is not available immediately; and (2) the intercommunication system does not know how long it will take to acquire a channel since the time to do so varies based on factors such as congestion, over-subscription, weak signals, etc. To address this problem, some prior-art intercommunication systems use a fixed transmit delay. When using transmit delay, the prior-art intercommunication system keys the radio as soon as it knows it needs to send audio to that radio's trunked-radio system, and it then begins buffering the audio until the transmit delay period expires. When the transmit delay expires, the buffered audio is released to the radio for transmission. This results in the transmission being delayed by the preset (or fixed) amount of time of the transmit delay. Prior-art intercommunication systems using transmit delay, however, suffer from three major problems: (1) latency; (2) audio clipping; and (3) outright failure.

Turning to the first problem, intercommunication systems using transmit delay introduce latency into the system that, in many situations, is unacceptable. The amount of time it takes to acquire a channel on the trunked-radio system is indeterminate (e.g., it may take a half of a second, or it may take five seconds). Because of this, the transmit-delay period is often set to the maximum amount of time it takes to acquire a channel (i.e., the worst-case scenario). Using the maximum transmit delay, however, introduces a significant amount of highly undesirable latency into the system because all communications to the trunked-radio system are delayed by the maximum amount. Therefore, in a situation where the transmit delay is set to 5 seconds but the channel is acquired in 1 second, the remaining 4 seconds of delay are wasted.

Turning to the second problem, intercommunication systems using transmit delay may unacceptably clip audio. Some prior-art connectivity systems set a short transmit delay to avoid the latency problem discussed above. When it takes longer than the transmit delay to acquire a channel, the beginning of the audio sent to the trunked-radio system will be clipped (i.e., not heard). For example, in a situation where the transmit delay is set to 2 seconds but the channel is acquired in 3 seconds, then 1 second of the audio will be clipped from the beginning. This could create a potential scenario in which a person says "Don't Shoot!" over the radio, but that audio is clipped and the person listening only hears "Shoot!"

Turning to the third problem, intercommunication systems using transmit delay may fail to acquire a channel Instead of receiving a Talk Permit Tone, the intercommunication system may receive a Failure Tone, indicating that channel acquisition has failed. In this case, the intercommunication system does not know that it does not have a channel and simply plays the audio to the trunked-radio system, but that audio will be unheard.

Although the above problems are described in the context of trunked-radio systems, the same problems apply to other audio communication systems that operate similarly to a trunked-radio system, such as push-to-talk wireless/cellular system in which the phones play out a Talk Permit Tone after a brief delay, once they have acquired a channel (or network path).

Accordingly, a need exists for devices and methods that patch audio sources into a trunked-radio system that allows for real-time communications without introducing unnecessary latency or audio clipping and that handles failures.

SUMMARY

It is an object of the present invention to provide an intercommunication system with Adaptive Transmit Delay that avoids the problems discussed above. An intercommunication system with Adaptive Transmit Delay in accordance with the subject matter disclosed herein buffers audio to be transmitted (referred to as outgoing audio) while listening for audio coming from a radio (referred to as incoming audio) and analyzing that incoming audio to determine if it is the Talk Permit Tone. If the system determines that the incoming audio is a Talk Permit Tone, then it can immediately release the buffered outgoing audio to the trunked-radio system because it knows that the radio has successfully acquired a channel.

According to one embodiment of the present invention, a method of using Adaptive Transmit Delay to patch an audio source to a radio system is disclosed. The method of using Adaptive Transmit Delay includes performing a training procedure to characterize an audible Talk Permit Tone coming from a radio in the radio system. The training procedure includes keying the radio. The training procedure further includes listening for a first incoming audio stream from the radio in response to keying the radio. The training procedure further includes performing a frequency analysis on the first incoming audio stream to generate an audio pattern. The audio pattern is representative of the Talk Permit Tone. The method of using Adaptive Transmit Delay further includes receiving an outgoing audio stream to be transmitted after the audio pattern has been generated. The method of using Adaptive Transmit Delay further includes, in response to receiving the outgoing audio stream to be transmitted, keying the radio. The method of using Adaptive Transmit Delay further includes, in response to receiving the outgoing audio stream to be transmitted, buffering the outgoing audio stream to be transmitted. The method of using Adaptive Transmit Delay further includes, in response to receiving the outgoing audio stream to be transmitted, listening for a second incoming audio stream in response to keying the radio. The method of using Adaptive Transmit Delay further includes, in response to receiving the outgoing audio stream to be transmitted, performing a frequency analysis on the second incoming audio stream. The method of using Adaptive Transmit Delay further includes, in response to receiving the outgoing audio stream to be transmitted, matching the results of the frequency analysis of the second incoming audio stream to the audio pattern representative of the Talk Permit Tone to determine whether the second incoming audio stream is the Talk Permit Tone. The method of using Adaptive Transmit Delay further includes, in response to determining that the second incoming audio stream is the Talk Permit Tone, sending the buffered outgoing audio to the radio.

In one embodiment of the method of using Adaptive Transmit Delay, listening for the first incoming audio stream from the radio in response to keying the radio includes determining whether the first incoming audio stream from the radio is above a threshold.

In one embodiment of the method of using Adaptive Transmit Delay, the training procedure is performed multiple times, with each iteration of the training procedure producing a raw pattern, and the audio pattern being generated as an average of the multiple produced raw patterns.

In one embodiment of the method of using Adaptive Transmit Delay, performing the frequency analysis on the first incoming audio stream from the radio comprises breaking the first incoming audio stream into one or more chunks and grouping the chunks into one or more master chunks.

In one embodiment of the method of using Adaptive Transmit Delay, performing the frequency analysis on the first incoming audio stream from the radio to generate the audio pattern comprises performing a Fast Fourier Transform on the first incoming audio stream to determine one or more frequencies contained in the first incoming audio stream.

In one embodiment of the method of using Adaptive Transmit Delay, performing the frequency analysis on the second incoming audio stream from the radio comprises running a Goertzel algorithm on the second incoming audio stream to determine if one or more frequencies contained in the first incoming audio stream are also contained in the second incoming audio stream.

In one embodiment of the method of using Adaptive Transmit Delay, matching the results of the frequency analysis of the second incoming audio stream to the audio pattern representative of the Talk Permit Tone to determine whether the second incoming audio stream is the Talk Permit Tone includes allowing for a variance between the second incoming audio stream and the audio pattern.

In one embodiment of the method of using Adaptive Transmit Delay, the radio is a wireless device in a wireless network.

In one embodiment of the method of using Adaptive Transmit Delay, sending the buffered outgoing audio to the radio includes sending a notification to end the transmit delay.

In one embodiment of the method of using Adaptive Transmit Delay, sending the buffered outgoing audio to the radio includes speeding up the buffered outgoing audio to reduce latency in transmission of the buffered outgoing audio.

In one embodiment of the method of using Adaptive Transmit Delay, sending the buffered outgoing audio to the radio includes dumping silence in the buffered outgoing audio to reduce latency in the transmission of the buffered outgoing audio.

According to another embodiment of the present invention, a method of using Adaptive Transmit Delay to patch an audio source to a radio system is disclosed. The method includes receiving an outgoing audio stream from an audio source. The method further includes keying a radio in the radio system. The method further includes buffering the outgoing audio stream from the audio source. The method further includes listening for a piece of audio coming from the radio in response to keying the radio. The method further includes, in response to hearing the piece of audio, sending the buffered outgoing audio to the radio.

In one embodiment of the method of using Adaptive Transmit Delay to patch an audio source to a radio system, listening for the piece of audio coming from the radio in response to keying the radio includes determining whether the piece of audio matches a previously generated audio pattern from the radio.

In one embodiment of the method of using Adaptive Transmit Delay to patch an audio source to a radio system, the buffered outgoing audio is sent to the radio when the piece of audio matches the previously generated audio pattern from the radio.

According to another embodiment of the present invention, an intercommunication system with Adaptive Transmit Delay is disclosed. The intercommunication system with Adaptive Transmit Delay includes an audio interface. The audio interface is configured to communicate with an audio device. The intercommunication system with Adaptive Transmit Delay further includes a memory. The intercommunication system with Adaptive Transmit Delay further includes a processor communicatively coupled to the audio interface. The processor of the intercommunication system with Adaptive Transmit Delay is configured to generate a pattern representative of a Talk Permit Tone based on an incoming audio stream using a Fast Fourier Transform. The incoming audio stream is received over the audio interface. The processor of the intercommunication system with Adaptive Transmit Delay is further configured to match a piece of incoming audio to the pattern representative of the Talk Permit Tone using a Goertzel algorithm. The processor of the intercommunication system with Adaptive Transmit Delay is further configured to send outgoing audio through the audio interface in response to a successful pattern match. The audio is sent before the expiration of a fixed transmit delay.

In one embodiment, the processor of the intercommunication system with Adaptive Transmit Delay is further configured to buffer the outgoing audio in the memory while the Goertzel algorithm is being run.

In one embodiment of the intercommunication system with Adaptive Transmit Delay, sending the outgoing audio includes speeding up the outgoing audio to reduce latency in transmission of the outgoing audio.

In one embodiment of the intercommunication system with Adaptive Transmit Delay, sending the outgoing audio includes dumping silence in the outgoing audio to reduce latency in transmission of the outgoing audio.

In one embodiment, the processor of the intercommunication system with Adaptive Transmit Delay is further configured to match the piece of incoming audio to the pattern representative of the Talk Permit Tone using the Goertzel algorithm by determining whether a frequency from the pattern is found using the Goertzel algorithm.

In one embodiment of the intercommunication system with Adaptive Transmit Delay, if no successful pattern match occurs, the intercommunication system sends the outgoing audio when a fixed transmit delay expires.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings.

DETAILED DESCRIPTION

Figure 1:
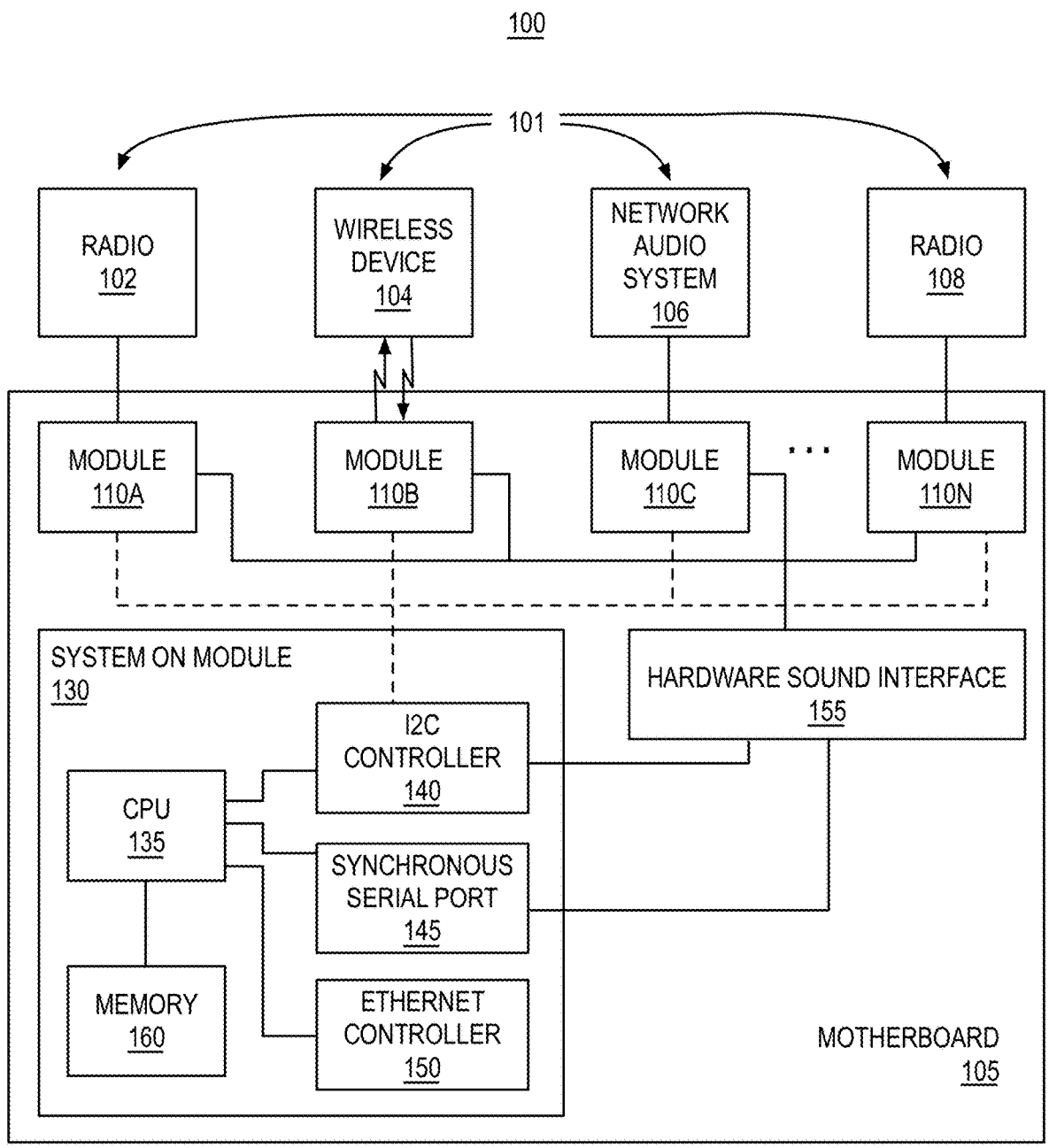
FIG. 1 depicts an exemplary high-level hardware architecture of an intercommunication system with Adaptive Transmit Delay.

The following description and figures are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

In the intercommunication system with Adaptive Transmit Delay in accordance with the subject matter disclosed herein, when outgoing audio needs to be sent to a trunked-radio system (e.g., in a situation in which a person speaks into a phone that is patched to a trunked-radio system), the system may key the radio to which the system is connected and simultaneously (or nearly simultaneously) begin buffering the outgoing audio from the person speaking into the phone. The intercommunication system may also listen to and analyze pieces of incoming audio from the keyed radio and take action based on the analyzed incoming audio.

The intercommunication system with Adaptive Transmit Delay in accordance with the subject matter disclosed herein may analyze incoming audio in two circumstances: (1) during training, for pattern generation; and (2) during normal operation, for pattern detection.

During training, the system may attempt to learn what the Talk Permit Tone sounds like for a particular radio (e.g., characterize the Talk Permit Tone). The system may key the radio and listen for pieces of incoming audio that it believes may be a Talk Permit Tone. After the system hears a Talk Permit Tone, the system may repeat the process of keying and listening multiple additional times (e.g., 2 more times). The number of times the system repeats the keying and listening may depend on a user request and/or configuration, and it may depend on the system's analysis of the tone coming from the radio. The system may use one or more of the multiple heard tones from the radio to generate a pattern that is representative of the Talk Permit Tone. The information learned during the training process may be saved across power cycles, so training may only need to be performed once (unless the radio changes). Training may be initiated through a web-based user interface of the intercommunication system. For example, an operator may click on a Training button on the web-based user interface and then select the module to be trained.

During normal operation, when a user desires to send audio to a trunked radio, the intercommunication system may key the radio and also begin buffering the outgoing audio to be sent. Additionally, the system may also listen for incoming audio from the trunked radio. The system may attempt to match the heard incoming audio to a pattern representing the Talk Permit Tone that the system generated during the training step.

If the intercommunication system determines that the heard incoming audio matches a pattern generated during training (e.g., the Talk Permit Tone), the system may end (i.e., cuts short) the fixed transmit delay and immediately or nearly immediately send the buffered outgoing audio to the radio, thereby shortening the transmit delay period. Because the fixed transmit delay may be cut short or ended when the system determines that a Talk Permit Tone has been heard, the system may be considered to implement an Adaptive Transmit Delay. If the system fails to match the heard incoming audio to a pattern generated during training, the system may assume that the heard incoming audio was a failure tone, and the system may re-key the radio (e.g., un-key the radio, wait a brief period, and then key the radio).

Re-keying the radio may give the radio another chance to acquire a channel. The system may re-key the radio as many times as necessary to successfully acquire a channel, or until an allotted buffer size is full. If the buffer becomes full before a channel is acquired, the system may send the outgoing audio to the radio, as if the system were using a fixed transmit delay, regardless of whether or not the system has determined that a channel has been acquired. By sending the outgoing audio at the end of a fixed transmit delay, the system may prevent audio from being completely lost in the situation where the system has determined a false negative-pattern match (i.e., the system determines that the radio has not successfully acquired a channel when, in fact, the radio has acquired a channel).

It should be noted that although the intercommunication system with Adaptive Transmit Delay is discussed herein in the context of a trunked-radio system, the same principles may be applied, consistent with this disclosure, to other audio communication systems in which an audio device in the system plays out a Talk Permit Tone (or a similar tone) once a channel (or network path) for communication has been successfully acquired. For example, the principles discussed herein may be applied to a push-to-talk wireless/cellular system. Similarly, the principles discussed herein may be applied to a system that uses applications (apps) on a wireless mobile device to provide a push-to-talk service over a network (e.g., a cellular connection, a Wi-Fi connection, or a Bluetooth connection).

FIG. 1 depicts an exemplary high-level hardware architecture of an intercommunication system with Adaptive Transmit Delay. This exemplary high-level hardware diagram is for illustrative purposes only and is not intended to limit the scope of the disclosure.

Referring to FIG. 1, the intercommunication system 100 includes a motherboard 105. The various components of the intercommunication system 100 are connected to one another on the motherboard 105. The motherboard 105 may include additional components that are not shown in FIG. 1, such as, for example, power regulation (e.g., power supply and one or more converters to provide necessary power signals), various connectors for external components (e.g., Ethernet ports, display ports, USB ports, etc.), and one or more small-scale microprocessors (e.g., network controller, display controller, etc.).

In one embodiment of the intercommunication system 100, the intercommunication system 100 include one or more modules 110a, 110b, 110c, through 110n, each of which may connect to an audio source 101. Audio source 101 may include any source that provides audio such as, for example, a radio 102 for a trunked-audio system or other type of radio system, a wireless device 104 (e.g., a cellular telephone, tablet, or portable computer), a network audio stream 106 (e.g., streaming service or VoIP telephone), a landline telephone, a local handset, a local headset, a microphone/speaker combination, or a Bluetooth device. As used herein, "module" may refer to a radio module that connects to a radio, a hardware module that connects to an audio source 101 other than a radio, or any other interface that communicates with an audio source 101, such as, for example, a network interface for streaming audio, or a software interface. A module may be responsible for providing an interface (e.g., a hardware interface or a software interface) to the audio source 101 to which it connects.

Each module 110a, 110b, 110c through 110n may be configured to communicate with the multiple types of audio sources 101, such that one particular module is capable of communicating with multiple types of audio sources 101 or one particular module is specific to a particular type of audio source. For example, module 110*a* shown in FIG. 1 may be configured to communicate with a radio in a trunked-radio system while module 110*b* shown in FIG. 1 may be configured to communicate with a cellular telephone over a cellular network. Alternatively, module 110*c* shown in FIG. 1 may be configured such that it is capable of communicating with either a radio in a trunked-radio system or a cellular telephone, depending on which type of audio source 101 to which it is connected. As an example, a GSM module may include a chip that acts like a GSM cellular telephone, and a slot for a SIM card, and an antenna jack. The modules 110*a* through 110*n* may plug into slots on motherboard 105 that supply power, I2C signals, analog audio, and other miscellaneous signals to the modules. Each module may include audio transformers to help isolate the audio from the physical radio, which may help prevent distortion, RF noise, power surges, etc. Each module may further include connectors/ports for connecting to an audio source.

Each of modules 110*a* through 110*n* in the intercommunication system with Adaptive Transmit Delay may include an analog 4-wire audio-centric connection. Each of modules 110*a* through 110*n* may support (in combination with software) various techniques of detecting the presence of valid audio, such as, for example, Hardware-COR, raw audio level (VOX), or Voice-Activity-Detection (VAD). The modules may further support numerous flow control features, audio gain adjustments, and other options. The modules may further support the Adaptive Transmit Delay described herein.

In one embodiment of the intercommunication system 100, the intercommunication system 100 includes a System on a Module (SOM) 130. The SOM 130 may be mounted to a connector on the motherboard 105 or may be part of the motherboard (e.g., soldered in during manufacturing). The SOM 130 may be an off-the-shelf part (e.g., a Raspberry Pi module), or it may be custom-designed ASIC or other type of module. In one embodiment, the SOM 130 includes a CPU 135 for running software, an I2C bus controller 140, a synchronous serial port 145 for carrying audio, and an Ethernet controller 150. In one embodiment, the CPU 135 may be an ARM CPU. In other embodiments, the CPU 135 may be of a different architecture (e.g., x86 architecture) and/or be provided by other vendors or may be custom-designed.

In one embodiment of the intercommunication system 100, the intercommunication system 100 includes a hardware sound interface 155. Hardware sound interface 155 may include, for example, one or more analog-to-digital converters and one or more digital-to-analog converters. As shown in FIG. 1, the hardware sound interface 155 may be connected to the modules 110*a* through 110*n* over a communication bus or other type of connection. Similarly, as shown in FIG. 1, SOM 130 may be connected to the modules 110*a* through 110*n* over a communication bus or other type of connection. For example, some embodiments may include an I2C bus for connecting one or more components of the system.

In one embodiment of the intercommunication system 100, the system includes one or more memories 160. The memory may be part of the SOM 130, or it may be a separate module connected on the motherboard 105. The memory may be any type of memory known in the art. The memory may store buffered outgoing audio, buffered incoming audio for analysis, and/or user settings and configurations.

In other embodiments, the system may not include separate or physical modules, but instead the required hardware for the module may be incorporated directly onto the motherboard. This may make the system cheaper to manufacture and/or more compact.

Figure 2:
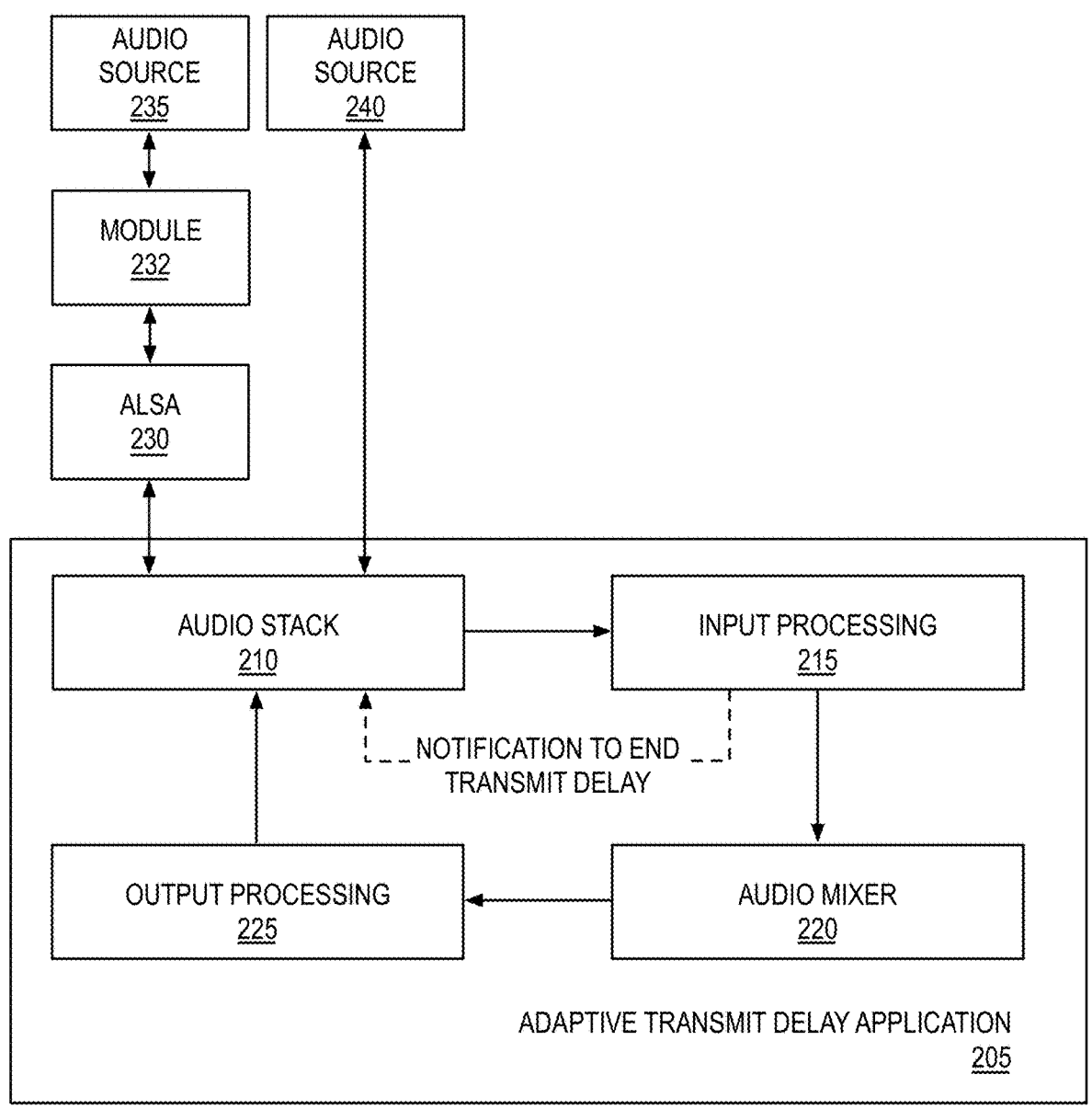
FIG. 2 depicts an exemplary high-level software architecture of an intercommunication system with Adaptive Transmit Delay.

FIG. 2 depicts an exemplary high-level software architecture of an intercommunication system with Adaptive Transmit Delay. This exemplary high-level software architecture is for illustrative purposes only and is not intended to limit the scope of the disclosure. The high-level software architecture may further include additional features, such as, for example, a custom web server/interface, configuration verification algorithms, storage of settings, etc.

Referring to FIG. 2, an exemplary high-level software architecture of an intercommunication system with Adaptive Transmit Delay is shown. Intercommunication system 200 implements Adaptive Transmit Delay as described herein. The software architecture of intercommunication system 200 includes an Adaptive Transmit Delay application 205. The Adaptive Transmit Delay application 205 may include an audio stack 210, an input-processing stage 215, an output-processing stage 225, and an audio mixer 220.

As explained in the context of FIG. 1, the one or more audio sources 235 and/or 240 provide audio to and/or receive audio from the intercommunication system 200. In some embodiments, the audio sources may be a hardware radio that connects to the intercommunication system 200 via one or more modules (described in FIG. 1). This is shown as audio source 235 and module 232 in FIG. 2. The audio sources 235 may include a radio in a trunked-radio system, a wireless device (e.g., cellular telephone), or a network audio stream. In other embodiments, the audio sources may be a software source that connects to the intercommunication system 200, such as an audio source that sends/receives audio over a network to stream to/from other systems/devices. This is shown as audio source 240.

In the embodiment shown in FIG. 2, the Adaptive Transmit Delay application 205 may use Linux's Advanced Linux Sound Architecture (ALSA) 230 to provide audio to one or more hardware audio sources (via one or more modules) and/or receive audio from one or more hardware audio sources (via one or more modules) (discussed above in the context of FIG. 1). The audio may be sent/received between the Adaptive Transmit Delay application 205 and the one or more hardware audio sources 235 via ALSA 230.

In the Adaptive Transmit Delay application 205, the incoming and/or outgoing audio may be handled by one or more audio stacks 210, depending on the type of audio source. For example, one audio stack may handle more than one audio source, and some audio sources may use different audio stacks than other audio sources (e.g., hardware modules may use a different audio stack than modules for network audio streams use).

In one embodiment of the Adaptive Transmit Delay application 205, incoming audio samples are formatted in a 16-bit PCM integer representation (i.e., each sample of audio is a 16-bit integer). In one embodiment, the Adaptive Transmit Delay application 205 handles 8,000 samples/second per module (i.e., an 8 kHz sample rate). The Adaptive Transmit Delay application 205 may receive incoming audio from ALSA 230 in 60-millisecond chunks, with 480 samples per chunk (i.e., 1000 ms/60 ms=16.66667 chunks per second; 16.66667*480=8,000 samples per second).

As shown in FIG. 2, incoming audio from audio source 235 may be sent from audio stack 210 through an input-processing stage 215, where the incoming audio is analyzed for different purposes. For example, the input-processing stage 215 may perform pattern-generation and/or matching on the incoming audio (described in more detail below).

Additionally, the input-processing stage 215 may decode the incoming audio into a float-based format that allows for more precise mathematical calculations during processing, run the incoming audio against a voice activity detection (VAD) algorithm to verify that the incoming audio is speech (as opposed to static, white-noise, etc.), and/or cancel transmit delay in the audio stack 210.

The intercommunication system 200 receives and listens to incoming audio from the audio source. To begin the input processing, the intercommunication system 200 may key the radio, which causes incoming audio from the radio to flow into the input-processing stage 215 for generating a pattern based on the incoming audio (e.g., during the training process) and/or for matching a pattern to the incoming audio (e.g., during normal operation after training has been completed). During pattern-generation and/or pattern-matching at the input-processing stage 215 in the Adaptive Transmit Delay application 205, the Adaptive Transmit Delay application 205 may perform frequency analysis on the incoming audio. As one example of frequency analysis, a Fast Fourier Transform (FFT) may be performed on the incoming audio during the pattern-generation process (as described in more detail below). As another example of frequency analysis, a Goertzel algorithm may be performed on the incoming audio during the pattern-matching process (as described in more detail below). The incoming audio may be divided into chunks, and each chunk of audio sent to the FFT and/or Goertzel algorithm may be 256 samples (i.e., 32 milliseconds). As explained above, incoming audio from the ALSA 230 comes in chunks of 480 samples each. Because chunks going into the FFT and/or Goertzel algorithm are chunks of 256 samples each (i.e., the complete 480-sample chunk (i.e., 60 millisecond) received from the audio stack 210 is not processed at once), the chunks may be split and stored (e.g., in memory) as necessary during processing.

In the Adaptive Transmit Delay application 205, the input-processing stage 215 may attempt to match the incoming audio to a pattern during normal operation after training has been completed. If the audio matches a pattern, the input-processing stage 215 may inform the audio stack 210 to end the transmit delay (shown as the dashed line in FIG. 2) and send the buffered outgoing audio to the audio source. By informing the audio stack 210 to end the transmit delay, the buffered outgoing audio may immediately (or nearly immediately) begin flowing out from the intercommunication system 200 to the module. If the incoming audio does not match a pattern, the intercommunication system 200 may send a signal to the module to re-key the radio (i.e., send a signal to key the radio again), and the intercommunication system 200 can try again to listen for a match in incoming audio. Whether or not the Adaptive Transmit Delay application 205 re-keys the radio may depend on timing and/or user configuration settings.

As shown in the example of FIG. 2, after the input-processing stage 215, the incoming audio (once validated by the input-processing stage 215) may be fed into audio mixer 220 from the input-processing stage 215. The audio mixer 220 may combine the audio from the radio with audio from other sources (if necessary) and send the resulting combined audio to output processing 225. The output processing 225 may deliver the audio to the audio stack 210 with instructions on which devices or remote destinations should receive the audio. The audio mixer 220 may distribute the audio to one or more entities that need to receive the audio.

As shown in FIG. 2, the output from the audio mixer 220 (e.g., the combined audio) may be fed to the output-processing stage 225. The output-processing stage 225 may encode the audio into a required/desired format for one or more destination. For example, the required/desired format may be different for various network streams than it is for modules.

As shown in FIG. 2, the combined/encoded audio may be fed from the output-processing stage 225 back to the audio stack 210 to ultimately be sent out to one or more modules (via ALSA 230). The audio stack 210 may apply transmit delay for one or more modules that require transmit delay. For example, a radio connected to a module may be keyed and the outgoing audio may be buffered while the transmit delay is applied.

In the example shown in FIG. 2, once the transmit delay expires, the buffered outgoing audio may be sent to a module (via ALSA 230). During that transmit delay period, the input-processing stage 215 may continue to receive incoming audio from the radio for processing and/or analysis.

In one embodiment, the software architecture described in FIG. 2 is implemented on the Linux Operating System. In other embodiments, the software architecture described in FIG. 2 may be implemented on the Windows Operating System, Apple's OSX Operating System, or any other operating system, including operating systems for a mobile device and/or custom operating systems.

The Adaptive Transmit Delay application 205 may run on an embedded product or processor (as opposed to a general-purpose computer), or it may run on a general-purpose computer. For example, the Adaptive Transmit Delay application 205 may run on an ARM CPU.

In the example shown in FIG. 2, the Adaptive Transmit Delay application 205 is written in the C++ programming language. In other embodiments, the Adaptive Transmit Delay application 205 may be written in other programming languages or combinations or multiple programming languages.

The Adaptive Transmit Delay application 205 may be configured such that it starts automatically after the operating system has completed initialization, or it may be configured such that it runs as an application on a general-purpose computer.

The Adaptive Transmit Delay application 205 may be configured such that it is multi-threaded, which allows for code organization and allows the application to prioritize actions as desired.

Training/Pattern-Generation

Figure 3:
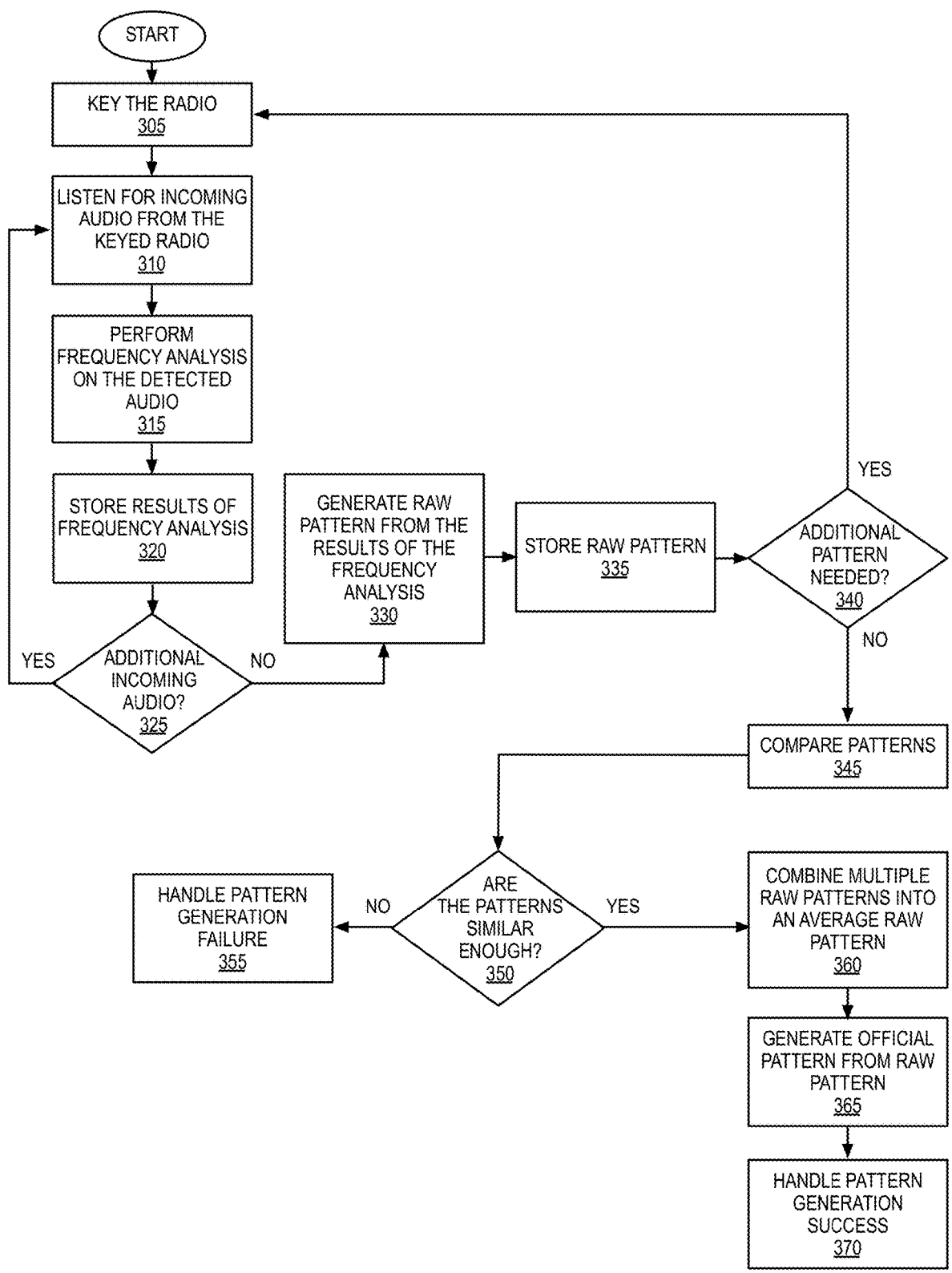
FIG. 3 depicts an exemplary flowchart of one implementation of a pattern-generation and combination process performed by an intercommunication system with Adaptive Transmit Delay.

FIG. 3 depicts an exemplary flowchart of one implementation of a pattern-generation and combination process performed by an intercommunication system with Adaptive Transmit Delay. As explained in more detail below, the pattern-generation process may include generating one or more raw patterns and combining the raw patterns into a final pattern.

Referring to FIG. 3, the intercommunication system begins the pattern-generation process by keying the radio, at step 305. As explained above, keying the radio is the process of momentarily pressing the transmit button on the radio, which sends a signal over the radio that the radio has information to transmit. Keying the radio may be performed by sending a signal to the module connected to the radio to be keyed. The module receives the signal and, in response, sends a signal to the radio connected to the module that causes the radio to be keyed.

After keying the radio, the intercommunication system listens to incoming audio from the radio after the radio has been keyed, at step 310. To detect the presence of audio coming from the radio, the intercommunication system looks for an audio signal that exceeds one or more threshold values (e.g., the system looks for audio that is sufficiently loud for a sufficient period of time to determine that what the system hears is audio and not low-level static or other system noise).

After the system detects audio, the system may perform a frequency analysis on the detected audio, at step 315. The frequency analysis performed on the detected audio may be performed by running a Fast Fourier Transform (FFT). The FFT is an algorithm that may be used to analyze frequencies over a given period of time (e.g., 30 milliseconds) to determine which frequencies are present within the audio and the strength of each frequency within that audio. In other embodiments of the intercommunication system, the frequency analysis performed at step 315 may be a Discrete Fourier Transform (DST) or a Fourier Transform (FT). In some embodiments, the frequency analysis (e.g., FFT, DST, and/or FT) may be performed in software (e.g., by the system's CPU). In other embodiments, the frequency analysis (e.g., FFT, DST, and/or FT) may be performed in hardware. For example, the frequency analysis (e.g., FFT, DST, and/or FT) may be performed by a digital-signal processor (DSP) or a field-programmable gate array (FPGA). In other embodiments, the frequency analysis (e.g., FFT, DST, and/or FT) may be performed by a combination of hardware or software. Performing frequency analysis in software and/or in hardware (e.g., DSP or FPGA) is well-known in the art.

The frequency analysis (e.g., FFT, DST, and/or FT) implemented by the system may use 256 samples per chunk (i.e., 32 milliseconds at an 8 kHz sample rate). It may be beneficial to use 256 samples per chunk because 256 is a power of 2 (which can be beneficial because it allows for more efficient calculations) and the algorithm can be run in a reasonable amount of time (i.e., a larger number such as 512 or 1024 samples may exponentially increase the computation time required). Additionally, it may be beneficial to use 256 samples per chunk because it maybe be easier to analyze tones having a short duration.

The system may store the results of the FFT in memory, at step 320. At step 325, the system determines if there is additional incoming audio from the radio that was keyed. If there is additional incoming audio, the system returns to step 310 to listen for additional incoming audio, perform frequency analysis on the additional incoming audio (step 315), and store results of the frequency analysis on the additional incoming audio (step 320). The system may repeat the frequency-analysis (e.g., FFT) step as many times as necessary, until the audio coming from the radio stops (i.e., the audio goes below a volume threshold for a period of time).

After the system has performed the frequency analysis on the incoming audio from the keyed radio, the system may simplify that information by turning it into a raw pattern. Once the audio coming from the keyed radio stops (i.e., there is no additional incoming audio), the system generates a raw pattern from the results of the one or more frequency analyses, at step 330. As explained below, the system may repeat the process of generating a raw pattern from the results of the one or more frequency analyses multiple times, depending on user settings and/or the system's analysis of the pattern.

As part of the process of turning the frequency-analysis data into a raw pattern, the raw pattern is refined by refining each chunk of audio. To do this, the system may ignore and/or discard one or more frequencies that are below a threshold. In other words, if the frequency was not strong enough within a chunk of audio, the system may not consider it to be part of the pattern. Similarly, the system may ignore and/or discard one or more frequencies that are near strong frequencies, even if those one or more frequencies are strong frequencies. By discarding frequencies that are near strong frequencies, the system may avoid looking at the same frequency multiple times. Having ignored/discarded one or more frequencies, the system may sort the remaining frequencies within a chunk based on the frequencies' strength (i.e., sort the frequencies into a strength order). By sorting the frequencies based on their strength, the system may be able to narrow down the number of frequencies it tries to match against when using the pattern while focusing on the most important frequency or frequencies.

The system may perform the steps of ignoring/discarding and sorting on each chunk of the audio being analyzed. After all the chunks are analyzed in this fashion, the system may store the chunk information as a raw pattern. At step 335, the raw pattern is stored in memory.

As mentioned above, after storing the chunk information as a raw pattern for the audio, the system may re-key the radio and gather another set of data in the same manner one or more additional times (returning to step 305). By gathering and analyzing multiple sets of audio for a Talk Permit Tone, the system may be able to create a more accurate (i.e., better) pattern. As explained in more detail below, the system may compare results of each run and combine the two most similar results to create a better representation of the frequencies in the radio's Talk Permit Tone.

Once the one or more patterns are stored in memory at step 335, the system determines if an additional pattern is needed, at step 340. The system may use multiple patterns to accurately determine a pattern for a Talk Permit Tone. The user may specify in user settings various parameters that determine aspects of how the analysis should be performed. For example, the user may desire a high degree of accuracy in the pattern generation (referred to as a strictness level), which would cause the pattern-generation process to be run multiple times and/or use strict pattern-matching requirements. As another example, the detected audio for one pattern may be a different length than the detected audio for another pattern, which may occur because the tones were different (e.g., one failed) or because of minor timing differences. In some instances, two generated patterns may not be similar to each other, which could indicate that one of the patterns is a failure tone (as opposed to a Talk Permit Tone). In these instances, getting an additional pattern allows the system to be better assured that the analyzed audio is a valid Talk Permit Tone.

As part of determining whether an additional pattern is needed in step 340, the system may determine whether any of the stored raw patterns are the same length. The system may look for raw patterns with the same number of chunks (i.e., the same number of FFTs was run when comparing the audio). If the length of a second raw pattern is the same as the length of a first raw pattern, the system may combine the first and second raw patterns without performing a third run to generate a third raw pattern. If the length of the second raw pattern differs from the length of the first raw pattern, the system may perform a third run to generate a third raw pattern and attempt to use two of the three raw patterns for combining. If additional raw patterns are needed for the analysis (step 340), the system keys the radio again, at step 305.

Thus, if the system finds two raw patterns of the same length, the system may determine that no additional pattern is needed and proceed to step 345, where it compares those two raw patterns. If there are no two raw patterns of the same length, the system may select the two raw patterns with the closest lengths. If the two patterns with the closest lengths are (although not identical) close enough in length to use, the system may center-align the shorter of the two raw patterns. The system may center-align the shorter of the two raw patterns by adding silence (i.e., "padding") at the beginning and the end of the raw pattern such that, with the padding added, the shorter raw pattern is the same length as the longer raw pattern. To center-align a raw pattern, the system may take half of the energy/amplitude from each frequency and put it into the neighboring chunk. Because FFTs are a representation of frequency information within a period of time (e.g., 30 milliseconds), it may be beneficial to shift a portion of the strength of each frequency into nearby chunks based on how far the strength is being shifted, rather than simply moving some frequencies and leaving other frequencies in place.

If the lengths of the two raw patterns differ from one another by too much (e.g., based on a percentage of the overall length), the system may not combine raw patterns and may instead report a failure to the user, requiring the user to try again, at step 355.

At step 345, the system may compare the two raw patterns (one of which may have had its length adjusted as described above) to determine how similar the two raw patterns are to one another. At step 350, the system determines if the two raw patterns are reasonably similar (e.g., similar enough to provide a reliable representation of a Talk Permit Tone). If the two raw patterns are reasonably similar, the system may be able to determine with a high likelihood that the raw patterns are both Talk Permit Tones. Failure Tones are generally uncommon in trunked-radio systems, so the likelihood of having received and analyzed multiple failure tones without receiving and analyzing Talk Permit Tones may be relatively low. Similarly, by verifying that the two raw patterns are reasonably similar, the system may be able to avoid generating a pattern based on invalid noise and/or static, or other analog audio imperfections. Generally, an exact match between the two raw patterns is unlikely, so the comparison of the two raw patterns may allow for variations based on, for example, percentages and/or nearby frequencies. In other words, the comparison may be used as a verification to provide the system with a reasonable level of certainty that the raw patterns are valid and of the same type of tone (e.g., not one Talk Permit Tone and one Failure Tone).

As explained above, the intercommunication system may combine raw patterns from multiple runs of gathering and analyzing audio to create a better representation of the frequencies in the radio's Talk Permit Tone. If, based on the comparison of patterns at step 345, the chunks of raw data are similar enough (determined at step 350), the system may average the raw patterns to create a single combined raw pattern, at step 360.

At step 360, the system may combine the multiple raw patterns into an average raw pattern. Regardless of whether the system performs this step one time to generate a single raw pattern or multiple times to generate an average raw pattern, the system ultimately arrives at a single raw pattern that represents the Talk Permit Tone of the radio.

At step 365, the system may further generate an official pattern that represents the Talk Permit Tone of a radio from the generated raw pattern by performing one or more additional refinement steps based on a strictness being applied. The system may use the resulting official pattern to compare to incoming audio to identify a Talk Permit Tone during normal operation.

The averaging of the raw patterns may be performed by adding the energy/amplitude for each frequency and then dividing by two. The system may then simplify the raw pattern using a similar methodology to how the raw data was reduced in the first place (as explained above). If, based on the comparison of patterns at step 345, the chunks of raw data are not similar enough (determined at step 350), the system may report a failure to the user, requiring the user to try again, at step 355. Alternatively, the system may base the pattern on a single run and skip the compare/combine steps (e.g., based on a user setting, configuration, or input).

As a result of finding and combining multiple similar raw patterns into an average raw pattern, the system may end up with a single raw pattern that may be used to generate an official pattern. Alternatively, if only one raw pattern was generated based on a user setting, the system may turn that raw pattern into an official pattern. The resulting official pattern may vary based on a strictness level. For example, the user may request that the system be strict, in which case the system may use more frequencies to generate an official pattern. Alternatively, the user may request that the system be lenient, in which case the system may use fewer frequencies to generate an official pattern. Other thresholds and rules may be applied based on the user's desired strictness level, for example, the amount of acceptable variance the matched audio may have in the volume level.

Figure 4:
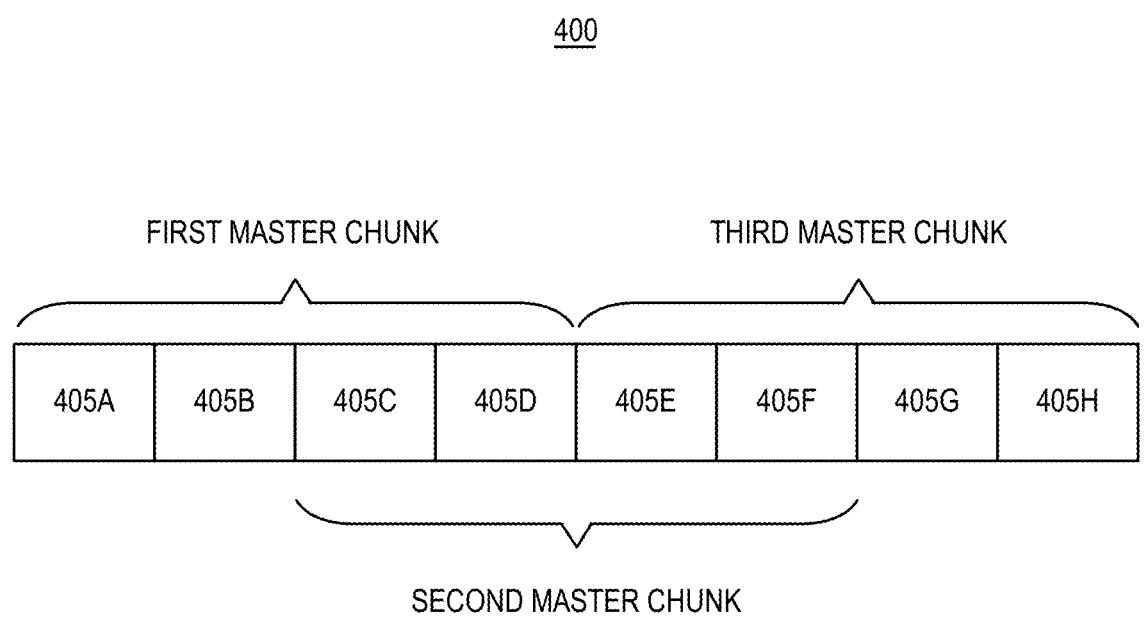
FIG. 4 depicts an exemplary structure of chunks of audio that comprise a generated pattern.

To generate the official pattern, the system may create multiple overlapping master chunks of the chunks of audio (see FIG. 4). In one embodiment, the system may use three master chunks. In other embodiments, the system may use other numbers of master chunks. In an embodiment in which the system uses three master chunks, the chunks of audio may be grouped into master chunks based roughly on the following percentages: (1) the first master chunk may contain the first half of the chunks (e.g., 0%-50%); (2) the second master chunk may contain the middle half of the chunks (e.g., 25%-75%); and (3) the third master chunk may contain the last half of the chunks (e.g., 50%-100%). For example, if there are six audio chunks, the system may group the chunks as follows: (1) chunks 1, 2, and 3 in the first master chunk; (2) chunks 2, 3, 4, and 5 in the second master chunk; and (3) chunks 4, 5, and 6 in the third master chunk. The number of chunks in each master chunk may be calculated based on the overall length of the raw pattern, and the calculation roughly divides the chunks based on the overlapping percentages listed above.

The system may condense the master chunks based on the raw chunks that each master chunk contains. For example, if the system finds a 900 Hz frequency in two of the raw chunks within a master chunk, the system may combine the total energy of those chunks. Similarly, the system may ignore/discard frequencies that are nearest to the strongest frequencies, just as it did for the original raw pattern. By doing this, the system may determine important frequencies within each master chunk and how strong those frequencies are.

The system may sort the frequencies in the master chunks based on the frequencies' strengths (i.e., in strength order), and the system may then apply strictness rules to provide a resulting pattern.

If a user of the system later decides to adjust the strictness level (e.g., to make the pattern less or more strict), the system may still have the raw pattern stored and available to use for adjusting the pattern according to the new strictness level.

The system may use the overlapping master chunks in the pattern instead of the original/smaller raw chunks because doing so may provide better results during the matching process. For example, the overlapping master chunks may help smooth out the pattern and/or help account for timing differences in the audio samples and/or slight mismatches with the detected tone start/stop times.

Once the official pattern is generated, the system stores the official pattern in memory and reports a success of pattern generation, at step 370.

The following high-level pseudo-code provides an example of an implementation of generating a pattern in the intercommunication system with Adaptive Transmit Delay in accordance with the present disclosure is shown below:

```
keyRadio( );
while(haveAudioComingIn) {
    if(audioHasEverExceededThreshold) {
        prepareFastFourierTransformBuffer( );
        runFFT( );
        discardMarginalFrequencies( );
        findStrongFrequencies( );
        discardFrequenciesNearStrongFrequencies( );
        sortFrequenciesInStrengthOrder( );
        storeRawChunk( );
    }
}
unkeyRadio( );
if(needMultiplePatterns) {
    storeRawPatternInMemory( );
    repeatRawPatternGenerationAsAbove( );
    if(firstTwoPatternsAreSameLength) {
        compareAndCombinePatterns( );
    }
    else {
        storeRawPatternInMemory( );
        repeatRawPatternGenerationAsAbove( );
        if(anyTwoPatternsAreSameLength) {
            compareAndCombinePatternsThatAreSameLength( );
        }
        else if(twoClosestPatternsAreCloseEnoughInLength) {
            adjustShorterPatternToBeSameLengthAsLongerOne( );
            compareAndCombinePatternsThatAreSameLength( );
        }
        else {
            handlePatternGenerationFailed( );
        }
    }
    if(patternGenerationWasSuccessful) {
        storeRawPattern( );
        generateMasterPatternFromRawPattern( );
        applyStrictnessToMasterPattern( );
        setPatternOnRadioConfigurationIfRequested( );
    }
}
```

FIG. 4 depicts an exemplary structure of chunks of audio that comprise a generated pattern.

As explained above in the content of FIG. 3, the intercommunication system with Adaptive Transmit Delay listens to incoming audio from the radio and uses that audio to generate a raw pattern that represents a Talk Permit Tone. Referring to FIG. 4, the generated pattern 400 may comprise three master chunks. As mentioned, incoming chunks of audio that are analyzed as part of a frequency analysis are 256-sample chunks (e.g., 32 ms at an 8 kHz sampling rate). The output of each iteration/execution of the FFT as part of the frequency analysis during pattern generation provides a piece of the raw pattern, where each piece is made up of a group of frequencies detected during the frequency analysis (e.g., using the FFT) in each 32 ms slot of time. Each piece (e.g., per 32 ms time slot) is referred to as a "sub-chunk." Each of the sub-chunks are represented as 405a-405h shown in FIG. 4. All of the sub-chunks 405a-405h together make up a raw pattern, which represents a list of frequencies in incoming audio arranged in the order they were detected during the frequency analysis. This raw pattern is compressed into three overlapping master chunks. For example, as shown in FIG. 4, sub-chunks 405a, 405b, 405c, and 405d make up the first master pattern, sub-chunks 405c, 405d, 405e, and 405f make up the second master pattern, and sub-chunks 405e, 405f, 405g, and 405h make up the third master pattern. The three overlapping master chunks make up the final pattern. If there are overlapping frequencies in the sub-chunks, the overlapping frequencies are combined in the master chunk. For example, if sub-chunk 405b and sub-chunk 405c are both in the first master chunk and both include a 900 Hz frequency, then the first master chunk includes one representation a 900 Hz frequency that contains the energy from both sub-chunks 405b and 405c added together. In other words, each master chunk is a simplified version of the raw list of frequencies (and their strengths/energies) from a part of the raw pattern. There are three master chunks that overlap parts of the raw pattern, which means that the raw/detected frequencies from the sub-chunks may get represented multiple times in the master chunks. Combining the energy from all of the frequencies in the sub-chunks allows the system to make the pattern more lenient in that each specific frequency does not have to be matched at a precise moment in time, and additionally reduces the amount of real-time processing that needs to be performed when trying to match the pattern.

Detection and Pattern-Matching

During normal operation of the intercommunication system with Adaptive Transmit Delay in accordance with the present disclosure, after the training process to generate a pattern for a Talk Permit Tone has been completed, the system may receive outgoing audio to be transmitted over a radio (via a module). When the system receives the outgoing audio, it must obtain a channel before sending the outgoing audio to the radio for transmission. To do this, the keys the radio and buffers the outgoing audio while listening for a Talk Permit Tone from the radio, signifying that the radio has acquired a channel for transmission.

The system may listen for the Talk Permit Tone by listening for incoming audio from the radio and attempting to match that incoming audio to a previously created pattern. If the audio coming from the radio matches a pattern, the system may determine that the audio is a Talk Permit Tone (i.e., the system may assume that the radio has successfully acquired a channel), and the system may then eliminate the remaining transmit delay and begin playing out the buffered outgoing audio immediately to the radio. If the incoming audio does not match a pattern, the system may re-key the radio to try again. In one embodiment, the audio-detection process may follow a series of steps to prevent unnecessary computation so that the system may "fail fast" and so that the system may process audio data in real time (or near real-time). For example, if the system detects early on in the process that the audio does not match the target pattern, the system may abort the pattern-matching process to save computational effort and also re-key the radio more quickly (if configured to do so).

Figure 5:
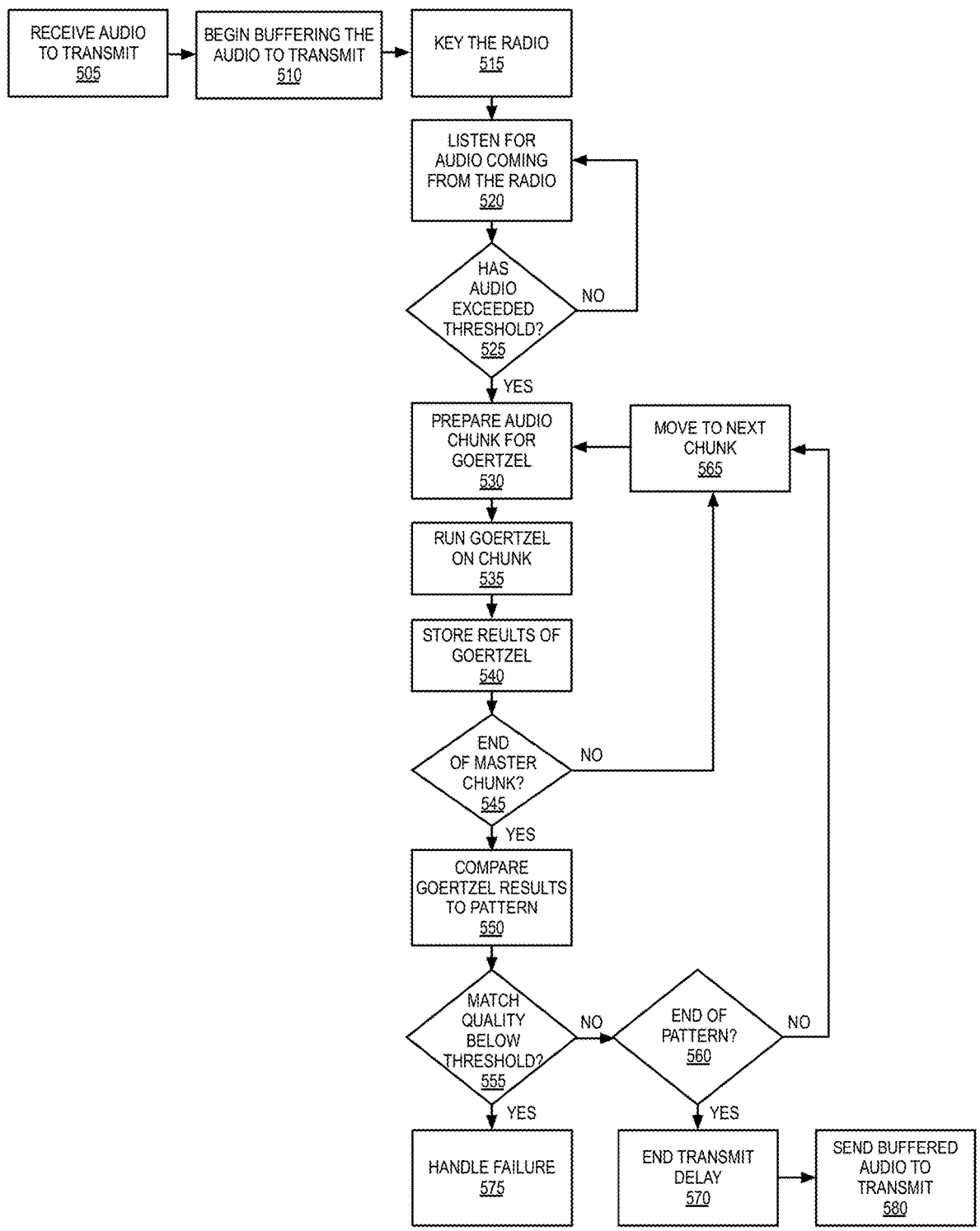
FIG. 5 depicts an exemplary flowchart of one implementation of a detection and pattern-matching process performed by an intercommunication system with Adaptive Transmit Delay.

FIG. 5 depicts an exemplary flowchart of one implementation of a detection and pattern-matching process performed by an intercommunication system with Adaptive Transmit Delay. The detection and pattern-matching steps discussed below may be performed when the system needs to actively listen for the Talk Permit Tone (i.e., after the radio has been keyed and is in its configured transmit delay period).

Referring to FIG. 5, at step 505, the system receives outgoing audio to be transmitted over a connected radio. At step 510, the system begins buffering the outgoing audio locally within the system (e.g., in memory). At step 515, the system keys the radio. As discussed above in the context of FIG. 3, the system keys the radio by sending a signal to the radio that causes the radio to be keyed.

At step 520, the system begins listening for incoming audio from the radio that has been keyed. The system is looking for audio in the incoming audio that matches the Talk Permit Tone that was determined during the training/pattern-generation process. The system may look for an audio signal that exceeds one or more thresholds in order to detect the presence of audio. As one example, the system may look for audio that is sufficiently loud (e.g., volume) for a sufficient period of time to determine that the audio is, in fact, audio rather than, for example, low level static or system noise.

At step 525, the system determines if audio of a sufficient volume (i.e., loud enough) has been previously received during the current transmit delay. If audio of a sufficient volume has been previously received during the current transmit delay, the system moves to step 530, where it prepares the incoming audio for frequency analysis. This is because, for example, the system can assume that the incoming audio is valid audio once a previous chunk of audio has reached the volume threshold. If audio of a sufficient volume has not been previously received during the current transmit delay, the system determines if the incoming audio chunk is of a sufficient volume (i.e., loud enough). If so, the system moves to step 530. If the incoming audio does not exceed the threshold, the system returns to step 520, where it continues to listen for incoming audio.

At step 530, the system prepares the audio for frequency analysis. To do this, the system may add the audio to a Goertzel buffer. The Goertzel buffer may be stored in memory within the system (e.g., the memory 160 shown in FIG. 1, or another memory on the system-on-module 130, such as a cache memory). The system continues to listen for incoming audio and store the incoming audio in the Goertzel buffer until the buffer is full (i.e., there is enough audio to perform the analysis). Once the Goertzel buffer is full, the system moves to step 535.

At step 535, the system performs a Goertzel algorithm on the audio chunks stored in the Goertzel buffer. This is done to attempt to match the received audio in the Georztel buffer to a pattern assigned to the radio from which the incoming audio is coming (which was generated during the training/pattern-generation process described in the context of FIG. 3). A Goertzel algorithm looks for a specific frequency within a chunk of time (e.g., 30 milliseconds) and provides an indication of how strong that particular frequency is. The frequencies that the system looks for in the incoming audio are based on a pattern assigned to the radio that the incoming audio is coming from (i.e., a pattern that was generated during the training/pattern-generation process discussed in the context of FIG. 3) and the point in time the system may be looking for the audio (i.e., how far into the pattern the audio may be). For example, at the beginning of the incoming audio chunk being analyzed, the system may look for all frequencies designated in the first master chunk of the pattern. In the middle, the system may look for frequencies designated in the first and second master chunks, or the second and third master chunks because the chunks overlap. At the end, the system may look for frequencies designated in the third master chunk.

The size of a chunk used for the Goertzel algorithm may be the same size as a chunk used for the FFT during the training/pattern-generation process (i.e., 256 samples or 32 milliseconds at 8 kHz).

When performing the frequency analysis on the incoming audio at step 535, the system may run multiple executions of the Goertzel algorithm on the incoming audio (as opposed to running an FFT on the incoming audio during the training/pattern-generation process, as discussed in the context of FIG. 3). Each execution of the Goertzel algorithm may allow the system to determine the strength, amplitude, and/or energy of a specific frequency. The system may store that information in memory. If the timing of a chunk means that it applies to multiple master chunks in the pattern (which commonly occurs because master chunks may overlap), then the system may also store that frequency information separately for the next master chunk in the pattern.

In other words, each master chunk may have a few frequencies that the system may be looking for, based on the pattern attempting to be matched. Each smaller (or raw) incoming audio chunk may be checked for those frequencies. As each smaller (or raw) chunk is checked, the results of the multiple executions of the Goertzel algorithm may be summed up. This allows the system to combine all the energy from all the raw chunks in the master chunk in the pattern (i.e., the system sums up the results for each raw chunk within the master chunk). This gives the system a representation of the total energy for the target frequencies within the master chunk in the pattern.

As part of the analysis performed by running one or more executions of the Goertzel algorithm on the incoming audio chunks, the system may adjust the strength, energy, and/or amplitude for the first frequency in the first master chunk in the pattern. The adjustment may compensate for an overall adjusted radio volume (i.e., if a user turned the volume up or down on the radio after training, making the tone louder or softer as heard by the system). To perform the adjustment for the first frequency in the first master chunk in the pattern, the system may compare the discovered amplitude with the target amplitude and determine a multiplier. The multiplier may be applied to the amplitude and one or more subsequent amplitudes throughout the detection process for all frequencies. In other words, if the frequency being analyzed is the first frequency in the master chunk, then the system calculates the multiplier and applies that multiplier. If the frequency being analyzed is not the first frequency in the master chunk, then the system applies the multiplier that was previously calculated for the first frequency.

At step 540, the system stores the results of the frequency analysis using the Goertzel algorithm in memory.

At step 545, the system determines if it has processed a complete master chunk. This may be done, for example, by determining if it has reached the end of a master chunk. If it has not processed a complete master chunk (e.g., it has not reached the end of the master chunk), then the system moves to the next chunk within the incoming audio, at step 565, and continues processing audio chunks by performing the Goertzel algorithm, at step 530. If the system has processed a complete master chunk in the pattern (i.e., the number of raw chunks in the master chunk (e.g., 3 raw chunks)), the system goes to step 550, where it compares the results of the executions of the Goertzel algorithm, which were stored in memory at step 540.

At step 550, the system compares the results of the executions of the Goertzel algorithm. It does this by calculating a match quality between the incoming audio and the pattern that the system is attempting to match. The match quality is calculated by performing an analysis to determine whether the frequency strength, energy, and/or amplitude information gathered by the one or more executions of the Goertzel algorithm match the expected values in the master chunk in the pattern. The system may compare some or all of the frequencies in the master chunk in the pattern to the detected values from the summation of all of the executions of the Goertzel algorithm across all the raw chunks for that master chunk in the pattern. In other words, the system may compare the detected values to the expected values. When performing the comparison, there may be flexibility based on the strictness level of the pattern. For example, more lenient patterns may allow for a wider range when considering the frequency as matched, whereas more strict patterns may use a narrower range. In addition, the strictness may also provide a minimum and/or a maximum amplitude modifier (used as explained above), number of frequencies are looked for, and other similar items.

With each frequency, a match quality may be calculated. If the frequency is within an acceptable deviation, variance, or range (i.e., "close enough"), the frequency may be considered a 100% match. If, on the other hand, the frequency is outside an acceptable range, the system may compute a match quality percentage. The system may average a specific frequency's match quality into an overall match quality for this specific detection attempt. If the overall match quality falls below a threshold (as dictated by the strictness of the pattern), the system may consider the attempted match to be a failure and determine that the audio does not match the pattern. If the attempted match is considered to be a failure because the match quality is below the threshold, the system may, at step 575, handle the failure based on other configuration settings. The failure handling is shown in more detail in FIG. 6. If the overall match quality is above a target or threshold, the system may continue to the next master chunk in the pattern (i.e., performing one or more executions of the Goertzel algorithm, summing them, and comparing them to the pattern).

At step 560, the system determines if it has reached the end of a pattern (i.e., the final master chunk in the pattern has been processed). If it has reached the end of the pattern and the overall match quality is still above a target or threshold, the system may consider the attempted match to be a valid match to the pattern. If the attempted match is considered to be a valid match to the pattern, then the system may take action on the success, at step 570. If at any point the overall match quality falls below a target or threshold, the system may consider the audio to be not a match to the pattern, as explained above, and handle the failure (step 575).

If the system successfully matches incoming audio to a pattern, it may immediately end the transmit delay period, thereby shortening the delay after detecting the Talk Permit Tone (i.e., Adaptive Transmit Delay). When the transmit delay period ends, the buffered outgoing audio may begin flowing to the radio because the system has determined that the radio has acquired a channel to transmit on.

If the system fails to match the incoming audio to a pattern, the system may take various actions, depending on the configuration the user has specified for the module. The configuration is stored within the system and may depend on the user and/or situation. For example, as part of handling the failure in step 575, if the module to which the system is connected is configured to "Re-Key on Failure," the system may un-key the radio, wait a brief period of time, and then re-key the radio. In this case, the system's detection process may start over, at step 505. As part of handling the failure in step 575, if the module to which the system is connected is not configured to "Re-Key on Failure," the system may leave the radio keyed and wait for the configured transmit delay to expire. When the configured transmit delay expires, the system may send the buffered outgoing audio to the radio. This may be beneficial in a situation in which the system failed to match a pattern for the Talk Permit Tone but the radio did, in fact, acquire a channel.

In other embodiments, the frequency analysis used for the pattern-matching process may include a Discrete Fourier Transform (DST) or a Fourier Transform (FT). In one embodiment, the frequency analysis and/or the Goertzel algorithm may be performed in software (e.g., by the system's CPU). In other embodiments, the frequency analysis and/or the Goertzel algorithm may be performed in hardware. For example, the frequency analysis and/or the Goertzel algorithm may be performed by a digital-signal processor (DSP) or a field-programmable gate array (FPGA). In other embodiments, the frequency analysis and/or the Goertzel algorithm may be performed by a combination of hardware and software. Performing frequency analysis and/or the Goertzel algorithm in software and/or in hardware (e.g., DSP or FPGA) is well-known in the art.

The following high-level pseudo-code provides an example of an implementation of matching audio to a pattern in the intercommunication system with Adaptive Transmit Delay in accordance with the present disclosure.

```
waitForAudioThatNeedsToBeSentToRadio( );
beginBufferingAudio( );
keyRadio( );
while(haveAudioComingInDuringBufferPeriod) {
    if(audioHasEverExceededThreshold) {
        // 256 samples with an 8kHz sample rate
        // is about 32 milliseconds of audio
        prepareAudioChunkForGoertzelAnalysis( );
        foreach(frequenciesInMasterChunk) {
            runGoertzelOnAudioChunk( );
            storeResultsOnAllMasterChunksThatResultsApplyTo( );
        }
        if(audioShouldBeTheEndOfTheMasterChunk) {
            compareGoertzelResultsToValuesInPatternFor
                                    MasterChunk( );
            if(matchQualityIsBelowThreshold) {
                handleMatchFailureProbablyByRekeyingRadio
                                    ToTryAgain( );
            }
            else if(haveReachedEndOfPattern) {
                handleMatchSuccessAndEndTransmitDelayPeriod( );
            }
        }
    }
}
```

Figure 6:
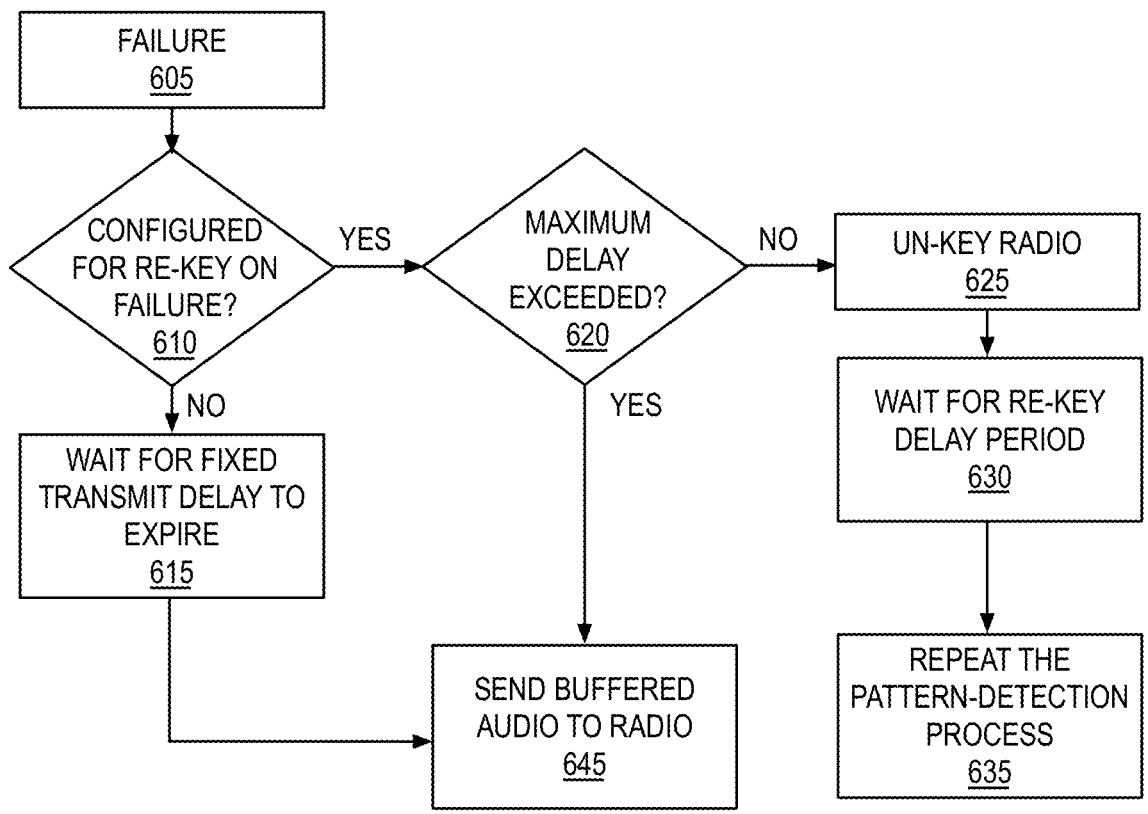
FIG. 6 depicts an exemplary flowchart of one implementation of failure handling for the pattern-detection process.

FIG. 6 depicts an exemplary flowchart of one implementation of failure handling for the pattern-detection process.

Referring to FIG. 6, the failure handling process starts a step 605. As mentioned above in the context of FIG. 5, if the pattern-detection process is unable to return a match for any reason, the system must handle the failure (shown as step 575 in FIG. 5). At step 610, the system checks whether the system is configured to "Re-Key on Failure." Re-Key on Failure may be a user-configuration setting that is either set by default or that the user can specify in an option setting or in a profile. In one embodiment, the Re-Key on Failure configuration may be stored in the memory of the system. If the system is not configured to Re-Key on Failure, then the system proceeds to step 615, where it waits for the fixed transmit delay to expire. Once the fixed transmit delay has expired, the system sends the buffered audio (i.e., the outgoing audio) to the radio for transmission at step 645. If the system is configured to Re-Key on Failure, then the system proceeds to step 620, where it determines whether a maximum delay has been exceeded. The maximum delay may be set by default for the system, or the user may configure the maximum delay as a user-configuration setting. If the maximum delay has been exceeded, the system sends the buffered audio (i.e., the outgoing audio) to the radio for transmission at step 645. If the maximum delay has not been exceeded, the system un-keys the radio at step 625. The system un-keys the radio by sending a signal to the radio that causes the radio to un-key. At step 630, the system waits for a re-key delay period. The re-key delay period may be set by default for the system, or the user may configure it as a user-configuration setting. Once the re-key delay period has expired, the system repeats the pattern-detection process at step 635 (e.g., as described in the context of FIG. 5).

In one embodiment, the intercommunication system uses "Busy Channel Detection" to implement the Adaptive Transmit Delay. In some radio systems, when the radio is keyed, the radio provides a "busy tone" to indicate that the radio system or the frequency is currently busy. Thus, instead of hearing a Talk Permit Tone indicating that the radio has acquired a channel, the system may hear a busy tone indicating that the radio cannot acquire a channel. The system may handle the busy tone in one of two ways. First, the system may keep the radio keyed (e.g., holding the key button) until the busy tone clears. Once the busy tone goes away, the channel is available. Second, the system may re-key the radio to try again. This may occur multiple times until the busy tone is no longer heard.

Figure 7:
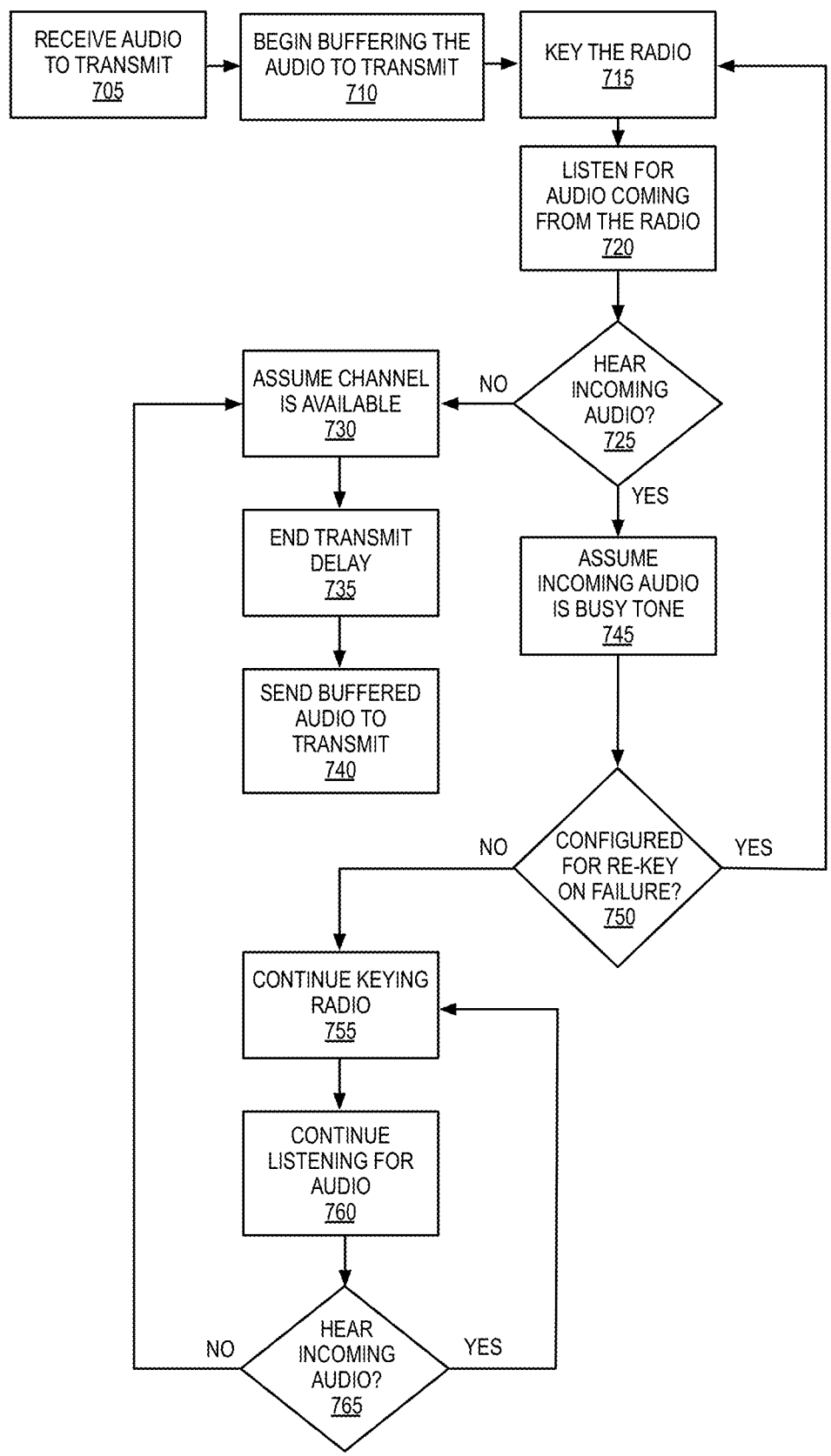
FIG. 7 depicts an exemplary flowchart of an implementation of Adaptive Transmit Delay using Busy Channel Detection.

FIG. 7 depicts an exemplary flowchart of an implementation of Adaptive Transmit Delay using Busy Channel Detection.

Referring to FIG. 7, at step 705, the system receives outgoing audio to be transmitted over a connected radio. At step 710, the system begins buffering the outgoing audio locally within the system (e.g., in memory). At step 715, the system keys the radio. At step 720, the system listens to the keyed radio for a brief period (e.g., 100-300 milliseconds) immediately after keying the radio. During this time, the system continues buffering the outgoing audio. If, at step 725, the system does not hear any incoming audio during the brief listening period after keying the radio, the system assumes the channel is available (step 730), ends the transmit delay (step 735), and sends the buffered audio to transmit (step 740). If, at step 725, the system hears any incoming audio during the brief listening period after keying the radio, the system assumes that the heard incoming audio is a busy tone, at step 745. If the system is configured to "Re-Key on Failure" (step 750), the system treats the busy tone as a failure and returns to step 715, where the system re-keys the radio and starts the process over. If the system is not configured to "Re-Key on Failure" (step 750), the system continues to send a signal to the radio so that the radio remains keyed (as if a physical user were holding the key button on the radio), at step 755. While the key button is being held, the system continues to listen for incoming audio, at step 760. As long as the incoming audio is heard (determined at step 765), the system continues keying the radio (step 755) and listening for incoming audio (step 760). If the incoming audio is no longer heard (determined at step 765), the system assumes that the busy signal is no longer occurring and that a channel is available (step 730), and the system ends the transmit delay (step 735) and sends the buffered outgoing audio to the radio for immediate (or near-immediate) transmission (step 740).

As mentioned above, the intercommunication system may include one or more system configuration settings that may be either set as default or set by a particular user. The system may use the system configuration settings when performing pattern-generation and/or pattern-detection. The settings may include "Re-Key After Silence" and/or "Re-Key Pause Time."

If a module of the system is configured to "Re-Key After Silence" and no audio is received within a specified period of time after keying the radio, the system may un-key and then re-key the radio. This may be beneficial in a situation in which the channel acquisition is taking an inordinately long period of time.

A module of the system may include a configurable "Re-Key Pause Time." If the system determines it needs to re-key the radio to which the module is connected (e.g., after a failed pattern match or because of silence), the amount of time the radio remains un-keyed may be based on the "Re-Key Pause Time."

If the system determines to re-key the radio (for any reason) but the transmit delay is about to expire, the system may not re-key the radio. This may be beneficial because it may prevent audio from being clipped in the situation in which the system failed to match a pattern for the Talk Permit Tone but the radio did, in fact, acquire a channel Because the transmit delay period is about to expire, the system may assume its pattern match was incorrect and play out the audio, rather than trying again. Otherwise, because it would take time to reacquire the channel, the beginning of the audio may be clipped.

In one embodiment, the intercommunication system may assume success when keying the radio. For example, instead of training the system to listen for a Talk Permit Tone and then matching to that pattern, the intercommunication system may listen for any audio coming from the radio after the radio has been keyed. In other words, the intercommunication system may assume that audio coming from the radio after the radio has been keyed is a Talk Permit Tone and not a Failure Tone. Based on this assumption, the intercommunication system may shortcut the transmit delay. Some advantages of an embodiment that assumes success may be (1) the intercommunication system may be simpler to implement; (2) the intercommunication system may rarely (or never) make a mistake, and (3) the intercommunication system would be very effective when working with radio systems that generally always (or nearly always) provide a channel when a radio is keyed.

In one embodiment, the intercommunication system may speed up buffered audio when sending it to a radio to reduce the latency in the transmission of the buffered audio. When the buffered audio is sped up, it may also be pitch-corrected so it sounds more realistic. Alternatively, when the intercommunication system plays out the buffered audio, the system may "speed up the silence" of the buffered audio by reducing natural pauses in speech or other blank space within audio (for example, by dumping silence before transmitting) to reduce latency in the transmission of the buffered audio. "Speeding up the silence" may allow the buffered audio to be sent out to the world more quickly without distorting the pitch or quality of the audio and may reduce latency and increase speed of communication.

In one embodiment, the intercommunication system may store one or more pre-generated patterns for known and/or common radios. For example, a user may be able to pick a pattern from a list of available patterns instead of going through an initial training procedure for training the intercommunication system to recognize the user's radio. In an embodiment in which the intercommunication system stores one or more pre-generated patterns, the system may be configured to allow for additional volume ranges than typical/user-trained patterns, since the volume of a particular radio may not be known.

In one embodiment, the intercommunication system may generate a pattern for a Failure Tone in addition to generating a pattern for the Talk Permit Tone. A pattern for a Failure Tone may allow the intercommunication system to confirm a failure to acquire a channel such that the system may re-key the radio with more confidence. In an embodiment of the intercommunication system that generates a pattern for a Failure Tone, the system may attempt to match a Failure Tone when a Talk Permit Tone is not detected.

In one embodiment, the intercommunication system may play an audible failure notification sound to the original speaker when the system determines that the radio may not have acquired a channel and therefore the transmitted audio may not have been heard. For example, for half-duplex devices, a failure notification may be played after the original speaker has finished talking, and for full-duplex devices, a failure notification may be played whenever appropriate (i.e., the failure notification could still be heard even if the speaker is talking).

In one embodiment, the intercommunication system may include a web-based user interface. The web-based user interface may allow a user or operator of the system to configure various settings, to train one or more of the modules in the system, and/or to dynamically patch one or more modules to one another.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby®, JavaScript®, Java®, Python®, PHP, C, C++, C#, Objective-C®, Go®, Scala®, Swift®, Kotlin®, OCaml®, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of using Adaptive Transmit Delay to patch an audio source to a radio system, the method comprising:
    performing a training procedure to characterize an audible Talk Permit Tone coming from a radio in the radio system, wherein the training procedure comprises:
        keying the radio;
        listening for a first incoming audio stream from the radio in response to keying the radio; and
        performing a frequency analysis on the first incoming audio stream to generate an audio pattern, wherein the audio pattern is representative of the Talk Permit Tone;
    receiving an outgoing audio stream to be transmitted after the audio pattern has been generated;
    in response to receiving the outgoing audio stream to be transmitted:
        keying the radio;
        buffering the outgoing audio stream to be transmitted;
        listening for a second incoming audio stream in response to keying the radio;
        performing a frequency analysis on the second incoming audio stream; and
        matching the results of the frequency analysis of the second incoming audio stream to the audio pattern representative of the Talk Permit Tone to determine whether the second incoming audio stream is the Talk Permit Tone; and
    in response to determining that the second incoming audio stream is the Talk Permit Tone, sending the buffered outgoing audio to the radio.

2. The method of claim 1, wherein listening for the first incoming audio stream from the radio in response to keying the radio includes determining whether the first incoming audio stream from the radio is above a threshold.

3. The method of claim 1, wherein the training procedure is performed multiple times, with each iteration of the training procedure producing a raw pattern, and the audio pattern being generated as an average of the multiple produced raw patterns.

4. The method of claim 1, wherein performing the frequency analysis on the first incoming audio stream from the radio comprises breaking the first incoming audio stream into one or more chunks and grouping the chunks into one or more master chunks.

5. The method of claim 1, wherein performing the frequency analysis on the first incoming audio stream from the radio to generate the audio pattern comprises performing a Fast Fourier Transform on the first incoming audio stream to determine one or more frequencies contained in the first incoming audio stream.

6. The method of claim 1, wherein performing the frequency analysis on the second incoming audio stream from the radio comprises running a Goertzel algorithm on the second incoming audio stream to determine if one or more frequencies contained in the first incoming audio stream are also contained in the second incoming audio stream.

7. The method of claim 1, wherein matching the results of the frequency analysis of the second incoming audio stream to the audio pattern representative of the Talk Permit Tone to determine whether the second incoming audio stream is the Talk Permit Tone includes allowing for a variance between the second incoming audio stream and the audio pattern.

8. The method of claim 1, wherein the radio is a wireless device in a wireless network.

9. The method of claim 1, wherein sending the buffered outgoing audio to the radio includes sending a notification to end the transmit delay.

10. The method of claim 1, wherein sending the buffered outgoing audio to the radio includes speeding up the buffered outgoing audio to reduce latency in transmission of the buffered outgoing audio.

11. The method of claim 1, wherein sending the buffered outgoing audio to the radio includes dumping silence in the buffered outgoing audio to reduce latency in transmission of the buffered outgoing audio.

12. A method of using Adaptive Transmit Delay to patch an audio source to a radio system, the method comprising:
  receiving an outgoing audio stream from an audio source;
  keying a radio in the radio system;
  buffering the outgoing audio stream from the audio source;
  listening for a piece of audio coming from the radio in response to keying the radio wherein the piece of audio coming from the radio indicates whether or not the buffered outgoing audio can be successfully transmitted by the radio; and
  in response to hearing the piece of audio, sending the buffered outgoing audio to the radio for transmission by the radio.

13. The method of claim 12, wherein listening for the piece of audio coming from the radio in response to keying the radio includes determining whether the piece of audio matches a previously generated audio pattern that represents an audible sound that indicates that the buffered outgoing audio can be successfully transmitted by the radio.

14. The method of claim 13, wherein the buffered outgoing audio is sent to the radio when the piece of audio matches the previously generated audio pattern.

15. An intercommunication system with Adaptive Transmit Delay, comprising:
  an audio interface, wherein the audio interface is configured to communicate with an audio device;
  a memory; and
  a processor communicatively coupled to the audio interface, wherein the processor is configured to:
    generate a pattern representative of a Talk Permit Tone based on an incoming audio stream using a Fast Fourier Transform, wherein the incoming audio stream is received over the audio interface;
    match a piece of incoming audio to the pattern representative of the Talk Permit Tone using a Goertzel algorithm; and
    send outgoing audio through the audio interface in response to a successful pattern match, wherein the audio is sent before the expiration of a fixed transmit delay.

16. The intercommunication system of claim 15, wherein the processor is further configured to buffer the outgoing audio in the memory while the Goertzel algorithm is being run.

17. The intercommunication system of claim 15, wherein sending the outgoing audio includes speeding up the outgoing audio to reduce latency in transmission of the outgoing audio.

18. The intercommunication system of claim 15, wherein sending the outgoing audio includes dumping silence in the outgoing audio to reduce latency in transmission of the outgoing audio.

19. The intercommunication system of claim 15, wherein the processor is further configured to match the piece of incoming audio to the pattern representative of the Talk Permit Tone using the Goertzel algorithm by determining whether a frequency from the pattern is found using the Goertzel algorithm.

20. The intercommunication system of claim 15, wherein if no successful pattern match occurs, the intercommunication system sends the outgoing audio when a fixed transmit delay expires.

* * * * *